United States Patent [19]
Browne et al.

[11] 3,993,865
[45] Nov. 23, 1976

[54] SCANNING SYSTEMS

[75] Inventors: Arthur Browne, Horley; Francis John Witts, Outwood, near Redhill, both of England

[73] Assignee: U.S. Philips Corporation, New York, N.Y.

[22] Filed: Sept. 4, 1975

[21] Appl. No.: 610,444

[30] Foreign Application Priority Data
Sept. 13, 1974 United Kingdom............... 40068/74

[52] U.S. Cl.................................... 178/7.6; 178/6; 178/6.8; 178/DIG. 2; 178/DIG. 32
[51] Int. Cl.²........................................ H04M 3/10
[58] Field of Search............ 178/6, DIG. 2, DIG. 32, 178/7.6, 6.8

[56] References Cited
UNITED STATES PATENTS

| | | | |
|---|---|---|---|
| 3,346,692 | 10/1967 | Garfield................................. | 178/6 |
| 3,541,248 | 11/1970 | Young.................................. | 178/7.6 |

OTHER PUBLICATIONS

J. C. Bliss, "Optical-to-Tactile Image Conversion for the Blind," 3-1970, pp. 58-65, *IEEE. Trans. on Man–Machine Systems*.

J. S. Brugler, "A Reading Eye for the Blind," Feb. 1971, pp. 18-22, *Optical Spectra*.

J. C. Tachzer, "Visual Word Reading," 3-70, pp. 44-53, *IEEE Trans. on Man–Machine Systems*.

*Primary Examiner*—Robert L. Griffin
*Assistant Examiner*—Edward L. Coles
*Attorney, Agent, or Firm*—Frank R. Trifari; Daniel R. McGlynn

[57] ABSTRACT

A hand-held scanning device is moved across a line of print and generates a two-dimensional scan of the print. A line array of photodiodes performs the scan in one direction and the movement across the paper generates strobe pulses each of which allows one scan of the array to be passed to a store from which a domestic T.V. set can be fed to provide an enlarged display. It may be used as a reading aid for partially sighted people or as an input device for an OCR machine.

In the case of a reading aid using a T.V.-type raster display, the store is organized to allow new array scans to be written in at a variable rate dependent on hand motion while the contents of the store are read out repetitively and non-destructively at a constant line-by-line rate suitable for the T.V. raster.

8 Claims, 5 Drawing Figures

SCANNING SYSTEMS

This invention relates to scanning systems and more especially to systems for scanning and transforming data consisting of alphanumeric characters, diagrams and the like. An important application of such systems is in the field of reading aids for blind or partially-sighted persons. In one known aid for the blind an expensive electronic camera is held by hand and moved manually along a line of print, the output of the camera being the transformed into a tactile display of the scanned characters. In another known aid for the partially sighted, a stationary conventional T.V. camera views reading material which is moved across it by the reader, the output of the camera being displayed by a T.V. receiver. One object of the present invention is to provide a much less complex and less costly aid suitable for partially sighted persons. Another object is to provide improved scanning systems which can be used as input devices for O.C.R. (Optical Character Recognition) machines.

The invention provides a data scanning and storage system comprising in combination:

a. an odometer device including a rotor which can be rolled along a line of data and an electric pulse generator driven by said rotor for generating strobe pulses at rate dependent on movement of said odometer;

b. a line of photo detectors carried by said odometer; substantially parallel to the axis of rotation of its rotor i.e. substantially normal to the direction of movement;

c. optical means secured to said odometer for the purpose of imaging on to said line of detectors at any instant an area of data adjacent to the odometer;

d. a store for a two-dimensional picture having storage elements at least notionally arranged in rows and columns, with a first column and a last column, the number of rows being equal to the number of said detectors; and e. means for loading into a column of said store new data brightness values derived from said detectors when a pulse occurs and discarding a corresponding amount of the oldest information stored.

Although such a system can be made to operate in an analog manner as far as brightness levels are concerned, the store can be simpler and cheaper if its storage elements are binary elements, and this is sufficient (or indeed desirable) for most reading-aid and O.C.R. applications. Binary operation of the store implies, in practice, the introduction of a threshold function to decide whether a particular scanned picture element of the data is to be treated as "black" or "white". The contrast between the background and the character is the basis of this digitisation. The final result is to assign to each element a number which has one of only two possible values. One value will be indicative of the background, the other value the character. For example, the number '1' may be assigned to the usually white background and usually black character areas respectively, with all shading of intensity or colour removed.

As will be appreciated by those skilled in the art, such a threshold may be applied between a detector and the corresponding row of storage elements or in the store itself. The level of the threshold may be preset or it may be manually adjustable for subjective optimum display when used in a reading aid. In other cases (e.g. O.C.R.) this level may be varied automatically. Finally, the store may be small enough to be carried by the odometer, or it may be a separate stationary device connected by cable to the hand-held unit.

Except if otherwise stated, the further features of the invention described hereinafter will be related to applications in the field of reading aids for the partially sighted.

When used for this purpose, the system also includes means for displaying the data contained in the store. There is, in fact, the advantage that the storage mode employed in the invention permits a section of scanned date to be displayed in enlarged form and such section will move and change in accordance with the movements of the hand of the user. The degree of enlargement can be varied to suit the degree of visual impairment: at one extreme it is possible to use a store of approximately square format so that substantially only one character is stored and displayed at a time. Conversely, for persons with better sight, the length of the store, as measured in terms of the number of columns, may be sufficient to contain a complete line of print from, say, a book or a column of a newspaper.

Each storage element of the store may actuate an individual light source, in which case the store and the display means may be constructed as a combined panel unit. Alternatively, the system may include means for scanning non-destructively the stored picture in the store in a manner suitable for display in a separate display device of the scanned or sequential type.

Figure 1:
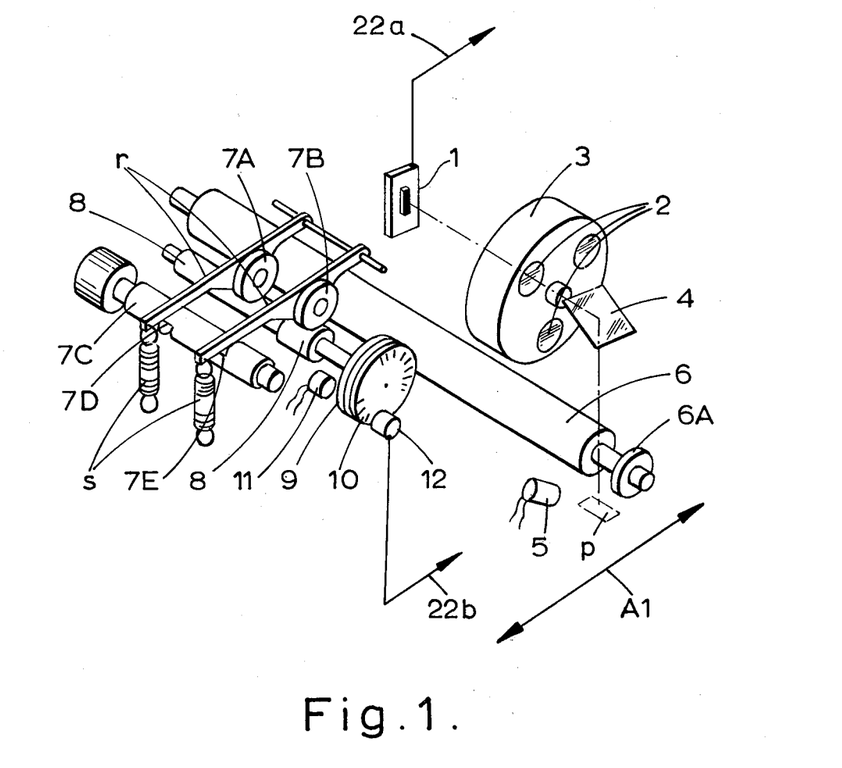
FIG. 1 is a perspective view of a handheld scanning or camera unit.

By using the latter method it is possible to utilize a conventional domestic T.V. receiver as the display means, in which case there can be a considerable saving in equipment. An embodiment based on this mode of operation will now be described by way of example with reference to the accompanying diagrammatic drawings in which:

FIG. 1 shows a small hand held unit which, when moved across a page in the direction A1, scans a strip of the page, e.g. one line of print, as a two-dimensional array of points. The unit consists of two principal parts, one associated with the scan across the strip and the other associated with the scan along the stip.

In the first, a line 1 of photo-detectors (e.g. a self-scanned array of photodiodes) converts the light into an electrical signal. The paper surface $p$ seen through a window in the casing of the unit (see 28, FIG. 2) is imaged on to the array by an optical system 2 – 4 so that a line perpendicularly across the strip (i.e. across A1) is imaged along the length of the array. In this way the line across the strip is resolved into a set of points, or small areas, corresponding to the layout of the detector diodes and, by the self scanning property of the array, a video line scan is obtained corresponding to the pressure or absense of light from the paper (the video output connection is shown at 22a).

A simple lens can be used to produce an image of a fixed magnification. In this implementation three lenses 2 in a turret 3, within the unit, are used to provide a choice of three magnifications, although a zoom lens system could be used instead. To produce a convenient shape for the unit, a mirror 4 can be used to "fold" the optical system as shown. A small lamp 5 is built into the unit to illuminate the paper although, of course, an external stationary light source could be used in some applications.

The scan along the strip of the page is controlled mechanically. An odometer rotor in the form of a roller 6 (which may carry a supplementary roller 6A) is built into the under-side of the unit and, having a highly frictional contact with the paper, rotates as the unit is moved across the page. The rotation is transferred, by an intermediate wheel 7A or 7B, to a second shaft 8 carrying a radial grating 9 (each wheel 7A– 7B is mounted on a rocker r having its free end urged downwardly by a spring s). A second similar grating 10 is mounted in a stationary position close to, and coaxially with the first. A light source 11 and photo detector 12 placed either side of the pair of gratings detects the modulation of the light caused by the rotation of the first grating. Strobe pulses are generated from the detector output and fed out via a connection 22b. One strobe pulses is generated for each unit of movement across the paper, the value of each unit being determined by the diameter of the roller 6, the drive ratio between the roller and the gating 9 and the number of lines on the gratings. In this implementation the drive ratio can be changed by selecting one or the other of the intermediate wheels 7A– 7B which are located at positions on shaft 8 having different diameters. This selection may be effected with the aid of a control shaft 7C having two cam surfaces 7D– 7E each of which can allow one of the wheels 7A– 7B to engage roller 6 and shaft 8 by releasing the respective rocker r. Two pitches of, say, 90 and 127 $\mu$m can thus be obtained and larger intervals can be derived from these by an electronic divider.

The scan cycle period of the array 1 is kept constant and shorter than the shortest time in which one interval on the paper will be traversed by hand (this interval is adjustable for the desired resolution or picture-element size). Following the generation of a strobe pulse the next complete scan from the array 1 is passed to the output. Scans which do not follow immediately after a strobe pulse are not passed to the output. In this way the self-scanning of the array and the hand motion together provide a two-dimensional scan which approximates to a notional regular grid. In this grid the grid pitches in the two directions do not have to be equal. In fact, in this implementation three resolutions may be used across the strip and they may by 90, 127 and 200 $\mu$m and are selected by changing the lenses. 2. If necessary, simple mechanical guides can be used to aid the process of following the required strip on the paper.

Two of the possible uses for the unit are as an input to an OCR (optical character recognition) machine and as an input to a reading aid for blind or partially sighted people. It is principally for partially sighted people that the device is envisaged at present. Successive outputs from the device 1, selected or gated by the stroke pulses, are fed to a store which is preferably of binary form as previously explained. The following description is based on this assumption and this implies that the detector output signals have a threshold applied to them in the store itself or in the circuitry between it and the detectors. As a result the stored signals have only two levels, one denoting, say, '0' or "background" (usually white) and the other denoting '1' or "character" (usually or notionally black). A hand-operated potentiometer may be provided to select the appropriate threshold level to convert the analogue video to binary before it is stored.

The store and the remainder of the apparatus will now be indicated briefly before the more detailed description which follows. The binary video signals are loaded into the store column by column. When the store is full, each new column of information causes the oldest previously stored column of information to be deleted. This process occurs at a variable rate since it depends on the motion of the user's hand (if the hand is stopped for a time, the information in the store remains constant). Independently, the information in the store is scanned nondestructively at a regular "frame" rate if it is to be displayed in a T.V. receiver, and appropriate line and field sync pulses are added to the binary video signals thus obtained so that the resultant waveform can be fed to a standard television set. (It will be modulated on to a VHF or UHF carrier unless the set has a video input terminal). In this way a magnified self-illuminating image of the paper is produced.

Figure 2:
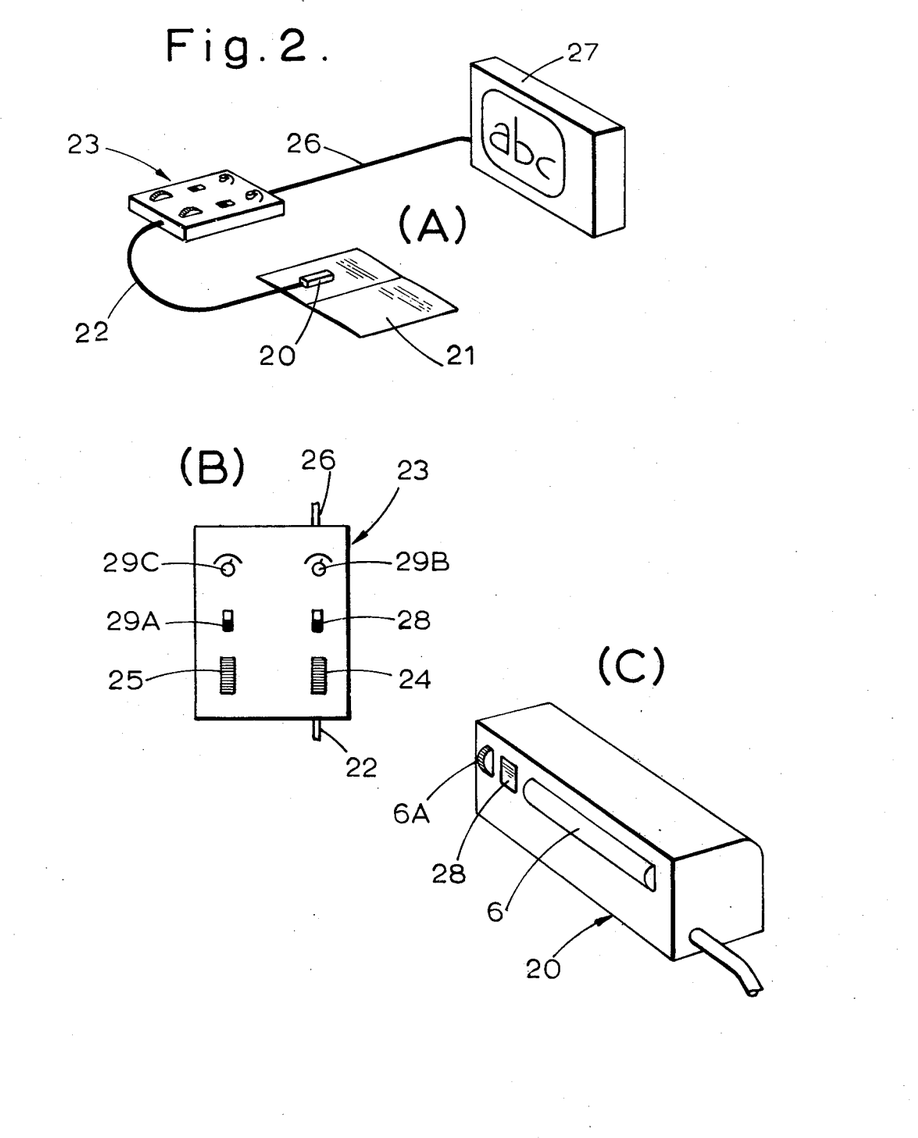
FIG. 2 shows a general layout of an arrangement including such a hand-held unit and a display unit.

A general layout is shown in FIG. 2, the hand-held camera or scanning unit being shown at 20 positioned on a book or document 21 (FIG. 2A). The unit 20 comprises the odometer and photo-detector elements of the system and is connected by a cable 22 to a control unit 23. Unit 23 may include the store and it includes an adjustable thresholding control 24 as shown in FIG. 2B. This unit may also comprise an on/off brightness control 25 and it has, in addition to the camera connection 22, an outlet 26 for connection to a television receiver 27 (FIG. 2A). The unit 23 may also include a switch 28 which selects an output giving black letters on a white background or vice versa. Other switches are provided to control the format and degree of enlargement of the display. Such switches may be controls 29A to select the horizontal pitch (this can double the pitches given by the drive ratio control in the camera,) 29B for the number of points displayed across the screen and 29C for the number of TV lines per row of the store. (29B controls the amount of storage used).

FIG. 2C shows the hand-held unit placed on its side so as to expose odometer rollers 6–6A and a window 28 for illumination by an internal light source 5 and for the optical input to the lens and detector system 1–2 contained within the casing of the unit.

Figure 3:
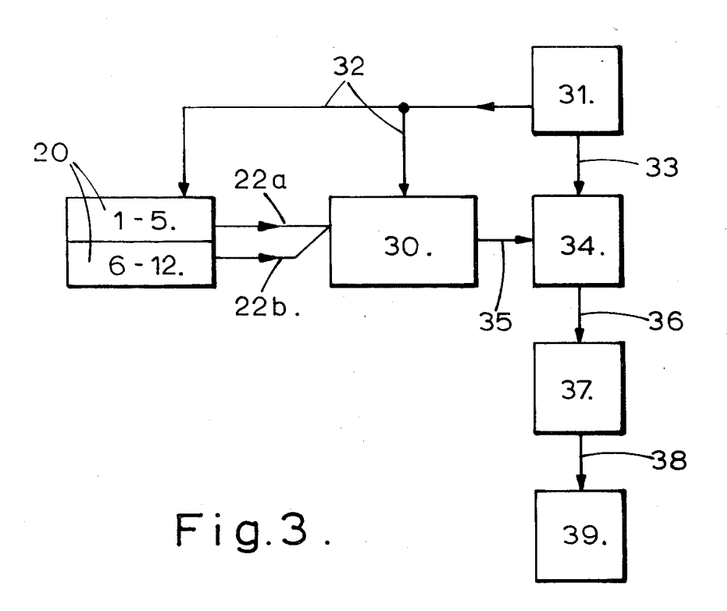
FIGS. 3–5 are illustrating circuitry diagrams suitable for the arrangement of FIG. 2.

FIG. 3 is a block schematic diagram of a~circuit arrangement which may be used in the camera construction and general layout of FIGS. 1 and 2 (particular values of frequency, storage capacity and resolution are given merely by way of example so as to clarify the description).

Assuming a linear self-scanned array 1 of 64 photodiodes (in the camera 20), the said array generates 64 pulses corresponding to the brightness levels of a line of 64 areas on the paper, which are imaged onto the array. This scan is repeated at a constant rate of, for example, one scan/ms. The clock rate for this scan frequency is not less than 64 pulses/ms. The video pulses are carried by line 22a and are compared with a d.c. signal from a potentiometer which may be set by the user to give the required division or thresholding into black and white in the picture displayed on the television set. Thus the video is converted to pulses such that a pulse represents black and a space represents white. This binary representation can now be stored.

The motion detector (6–12) generates a strobe pulse when the camera has been moved along the line of print by a predetermined amount, e.g. 127μm. This pulse is carried by line 22b and is remembered by the store control and, when the next line scan from the camera starts, the line is written into the store (30, FIG. 3). The store is a random access semiconductor store, although a shift register store can be organised to perform the same function. The requirement is that data can be written into its columns of storage elements (a column being 64 elements or bits long) at a rate determined by the camera and motion detector and read out from its rows, the time for each row corresponding to the line rate of a television raster.

During read-out, the picture element rate is high, 2 MHz for example. This gives insufficient time, for example only 0.25 μ sec, for the store to be separately addressed for each picture element. However, if a number of adjacent picture elements for part of one T.V. line can be read out of the store simultaneously in response to a single applied address, the addressing rate can be reduced to a practicable value. A shift register forms a convenient intermediate store for receiving this number of picture elements as they emerge in parallel from the store. Shift pulses can then be applied to this shift register to read the picture elements out serially at the required video rate, for example 2 MHz.

In a practical example, the number of picture elements read out in parallel is 12. This is achieved by assembling the whole store from 12 identical random access memories (RAM) of a commerically available M.O.S. type of integrated circuit for example INTEL type No. 2102 units. INTEL is a registered trademark of Intel Corporation, Santa Clara, Calif. Each store has a capacity of 1024 bits organised into a matrix of 16 columns and 64 rows. Each column, therefore, is arranged to receive the outputs of the 64 detectors in the vertical line array of the scanner at a predetermined moment when information is being written into the store. A picture 64 bits high and 16 × 12 = 192 bits wide can therefore be stored.

Figure 4:
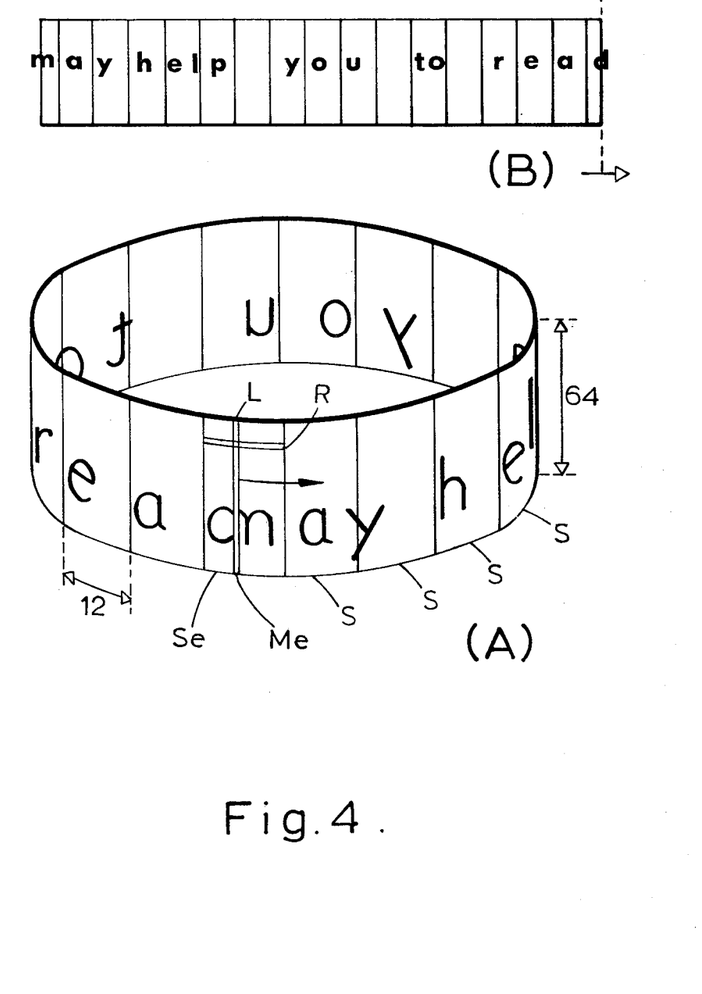

The organisation of the store may be understood by considering FIG. 4 which shows schematically at (A) a notional structure in the form of a cylinder 64 bits high and 192 bits in circumference (the same structure is shown at (B) in developed form). The circumference is divided into 16 sectors S, each sector being 12 bits wide. Each RAM provides a column of 64 bits in the same position of each of the 16 sectors. The first sector, for example, has 12 columns each of which is the first column of each of the 12 RAM's. These 12 columns contain 12 consecutive columns of picture information in the order in which they were written in by the scanner. Thus any bit in the store has a unique address defined by a row number R (00 to 63), a sector number S (00 to 15) and a RAM number M (00 to 11). During read-out, if the same row number R and the same sector number S are applied to all 12 RAM's, 12 adjacent bits of the picture of the row R in sector S will emerge in parallel from the RAM outputs as required for loading into the intermediate shift register.

If the notional cylinder into which the store has been organized could be seen and the stored bits made visible, a number of characters previously scanned by the column of detectors, would be seen in correct order around the cylinder. The effect of the column of detectors would appear as a single vertical line L moving from one column to the adjacent column each time a strobe pulse is generated by the hand-held scanner. This line would appear to erase the old information in the column into which it moves and to write in new information. Thus, as the line L moves round the cylinder, the total number of pixels (picture elements) stored remains constant at the previous 192 columns of printed matter most recently scanned by the detector column.

Figure 5:
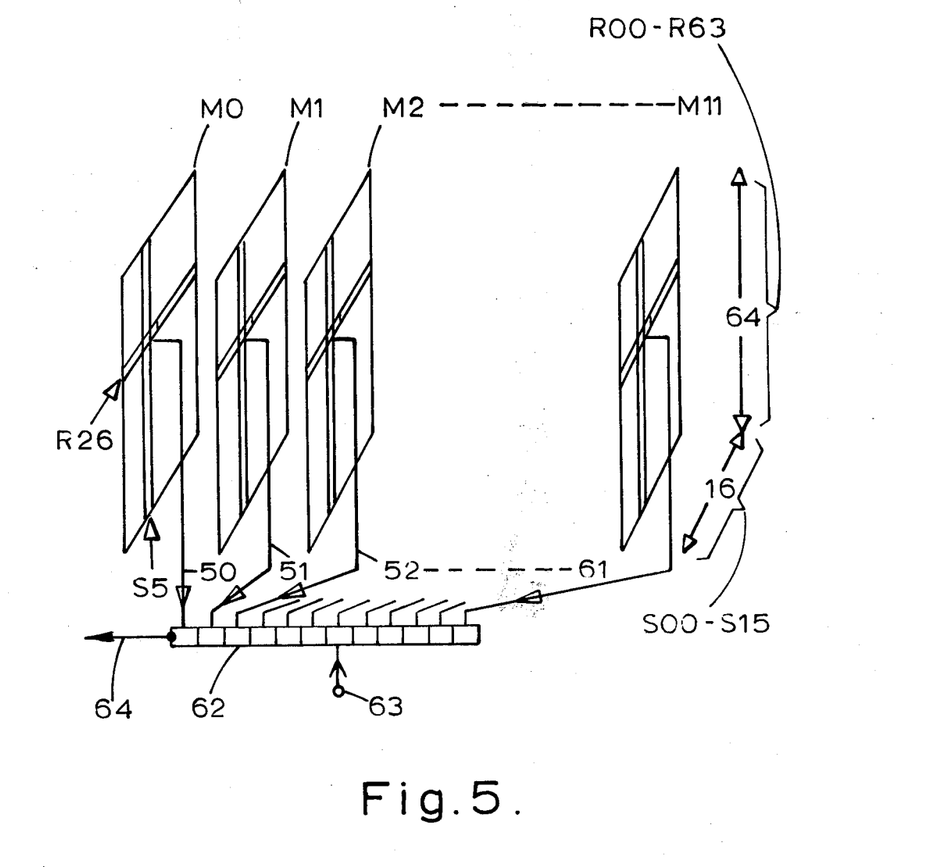

FIG. 5 shows the schematic circuit organisation of the store shown as a cylindrical structure in FIG. 4. The twelve RAM stores are shown as rectangular planes M0 to M11. Each of these planes has 16 columns (S00 to S15 each having 64 storage locations forming rows R00– R63. The columns of the same address number in all 12 planes provide the 12 columns in one of the sectors of the cylindrical structure. An example is shown of row R26 and column S5 being addressed simultaneously in all 12 planes for read-out and display. The 12 consecutive pixels of Sector 5 along row 26 are obtained in parallel along the output lines 50 to 61 and are entered in parallel into the shift register 62. Clock pulses are then applied to all stages of the shift register on terminal 63 at the pixel rate required in the display. The 12 consecutive pixels of row 26 in Sector 5 are then shifted out of the register 62 serially at terminal 64 as a video signal. During the time which elapses while these 12 pixels are being displayed, the sector address can be increased by one column to column S6. The 12 pixels of Sector 6 are not entered into the shift register 62 until a clock pulse is applied to all 12 planes at the same time as the last pixel of Sector 5 is being displayed. Shift pulses are applied to terminal 63 without a break so that the 12 pixels of Sector 6 are displayed in succession along row R26 of the display after they have been entered into register 62. Two shift registers 62 may be used alternately to receive parallel information from the store and to shift serial information to a common output terminal.

The stored picture has its left-hand edge in one of the columns and continues around the cylinder to the adjacent column. The address ($S_e M_e$) of the column containing the right-hand edge of the picture is stored until a new line is to be written in from the scanner at which point this stored address is increased to that of the next column (containing the left-hand edge). Each address R in the column is accessed in turn and the new data written in bit by bit. Writing is in interleaved with the action of reading out for T.V. display.

With the store organised in this way, only a complete sector of a line of the picture can be read out. In general, however, the right-hand edge of the picture will be found part way along one of the 16 sectors. In reading out for T.V. display, it is desirable that the lines of the displayed picture should start immediately after this right-hand edge so that the most recent output of the column of detectors will always be displayed at the right-hand side of the T.V. screen. To this end, the appropriate row R and the sector $S_e$ containing the picture edge are addressed at the start of each T.V. line scan. The 12 bits from all of the addresses M are read in parallel into the shift register. The serial output from the register will be used to modulate the display, as previously mentioned. The content of the register is shifted serially until the bit from RAM number $M_e$, the picture edge, is at the register output and the system waits until the blanking of the T.V. line scan has ended. Then the data is shifted serially from the register and this oldest part of the line displayed. The register clock period for 192 pixels is equal to the duration of the unblanked period of a T.V. line divided by 192. When this part-sector has been displayed, all of the next oldest sector is loaded into the shift register and displayed. This is repeated until sector $S_e$ is reloaded and the part of this sector not displayed at the start of the T.V. line (and containing the most recent part of the line) has been displayed.

When the picture as displayed is to be expanded in the horizontal direction, fewer stored characters will occupy the T.V. picture width. This means that the T.V. line will contain less than 192 pixels, and that fewer columns of bits in the RAM's will need to be addressed. To avoid complicating the read-out circuits, however, the basic cylindrical store having 16 sectors is retained. An alteration is made during writing-in which reduces the number of columns per sector. For example, 8 columns only may be used per sector, rather than the full 12 columns. In this case, the last 4 RAM's are not addressed during write-in and the total picture if now only $8 \times 16 = 128$ columns wide. During display, all 12 RAM's are addessed as before for simplicity but only the first 8 bits are clocked out of the shift register. At the same time the clock pulse frequency for the shift register is reduced in the ratio of 8 to 12. Thus the time taken for all 128 pixels in a line to be displayed still equals the time of one standard T.V. line. Thus the whole width of the display tube is now occupied by only 128 pixels and hence the number of characters displayed is reduced in the ratio of 8 to 12, each character being expanded horizontally in the inverse ratio.

The store has to be matched to the raster pattern of the television receiver. A fully interlaced raster can be used to reduce the effect of the line pattern but identical pictures are modulated onto the two fields. From the required aspect ratio of the display it is determined that the height of the picture should cover a certain number of T.V. raster lines. For convenience this is restricted to be a multiple of 64, the multiple being preferably an even number, e.g. 2 or 4. For a T.V. set of the 625-line type, the maximum number of lines visible for one field is 287, but in some cases it may be desirable to provide so much enlargement that not all of the 64 rows can be displayed and hence the ratio of television lines per field to the number of rows in the store can be greater than the apparent limit of 4. When generating the video waveform for the television set, the output of each row in the store is repeated for the requisite number of television lines, for example four lines.

Three examples of the vertical expansion of the characters that can be obtained by this method will now be given. It is a practical convenience in the T.V. line counting circuit to use a 623 line system, this being well within the tolerance of a standard 625 line receiver. Each field therefore has 286 lines available for the picture. If expansion by a factor of 2 is required, each store line is displayed twice on a pair of adjacent lines in each field, making 4 display lines per store line in each frame rather than 2 in the unexpanded picture. Thus $64 \times 2 = 128$ lines of the T.V. field picture are used for store display. The remaining 158 lines appear as 79 blank lines above and 79 blank lines below the displayed band. Assuming that only the characters appear bright, it is desirable for the upper and lower limits of the columns of the store to be marked by brightening lines No. 79 and No. 208.

If expansion by a factor of 4 is required, each store line is displayed four times on four adjacent lines of each field. Thus $64 \times 4 = 256$ lines are used in each field, leaving 15 blank lines above and 15 blank lines below. The displayed band-lines No. 15 and No. 272 may be brightened to mark the upper and lower limits of the store.

If expansion by a factor of 6 is required, $64 \times 6 = 384$ lines would be needed for each field. This is more than the 286 lines available. Only the central 48 lines of the store are now displayed, all but one line being displayed 6 times and the last line 4 times. The store now more than fills the vertical height of the display and no upper and lower store markers are needed to assist the user.

A T.V. sync generator 31 generates the clock and control signals for the camera and the store (fed via line 32) and also the synchronising waveform (fed via line 33) for the television set. The latter is added, in a unit 34, to the binary video signal fed from the picture store 30 via line 35. The resulting composite video signal is fed via line 36 and used to modulate an appropriate low-power V.H.F. or U.H.F. oscillator 37. The output from the latter is fed via line 38 to (and is compatible with) the R.F. input of a standard television set 39 (if this set has a video input terminal, unit 37 can be omitted).

In the examples illustrated the line of photo-detectors 1 may be a self-scanning array of the type manufactured by Integrated Photomatrix Ltd as Type IPL 7064. Although intended mainly for forward scanning along a line of print, the hand-held unit 20 can be moved backwards at a faster rate in order to find the beginning of the next line of print. In this phase the rollers 6–6A can be allowed to slip so that fewer strobe pulses are generated, the reduced detail thus provided for the display being sufficient to guide the reader's movements so that the next line of print is found. Apart from such line-by-line scanning of printed matter, the unit 20 can also be used to explore diagrams and the like in which case it may be desirable to move the unit in directions which are not parallel to the lines of print in a document. Although described mainly in relation to an aid for partially-sighted persons, the invention can be used in other applications where a similar scan, in the form of a two-dimensional array of points, is required. One such application is in O.C.R. where printed information is to be passed at a low rate to a recognition system. The paper handling system, often the most expensive part of a reading machine can thus be eliminated, by applying the invention in its more general form which does not include the display device.

What is claimed is:

1. A data scanning and storage system comprising in combination:
   a. an odometer device including a rotor which can be rolled along a line of data by hand and an electric pulse generator driven by said rotor for generating strobe pulses at a rate dependent on movement of said odometer;
   b. a line of photo detectors carried by said odometer
   c. optical means secured to said odometer for the purpose of imaging on to said line of detectors at any instant an area of data adjacent to the odometer, said area being substantially parallel to the axis of rotation of said rotor i.e. substantially normal to the direction of hand movement;
   d. a store for a two-dimensional picture having storage elements at least notionally arranged in rows and columns, the number of rows being equal to the number of said detectors; and e. means for loading into a column of said store new data brightness values derived from said detectors when a strobe pulse occurs and discarding a corresponding amount of the oldest information stored.

2. A system as claimed in claim 1 wherein the store is a two-state binary store.

3. A system as claimed in claim 1 or claim 2 wherein the store is of a type such that stored data can be read out non-destructively for use in a display device.

4. A system as claimed in claim 3 including means for effecting the read-out in a serial manner and adding sync pulses to such output so as to provide a video signal suitable for display by a display device of the raster-scanning type.

5. A system as claimed in claim 4 wherein the store comprises a predetermined number of identical non-destructive read-out random access stores, a shift register having a stage for each of said stores, means for reading out in parallel a picture element from a storage location in each of said stores, said storage locations having a common address, means for writing such picture elements in parallel into corresponding stages of the shift register, said picture elements being consecutive picture elements in a line of the displayed picture, and means for shifting said picture elements serially out of the shift register as the said video signal.

6. The combination of a system as claimed in claim 1 with a display device adapted to provide an enlarged display of any data scanned by hand movement of the odometer and detectors.

7. A combination as claimed in claim 6 wherein the display device comprises a cathode-ray tube.

8. A combination as claimed in claim 7 wherein the display device is a domestic T.V. receiver.

* * * * *